Nov. 9, 1943.  D. P. DAVIES  2,334,146
TURBULENCE CYLINDER HEAD
Filed Aug. 25, 1941  2 Sheets-Sheet 1
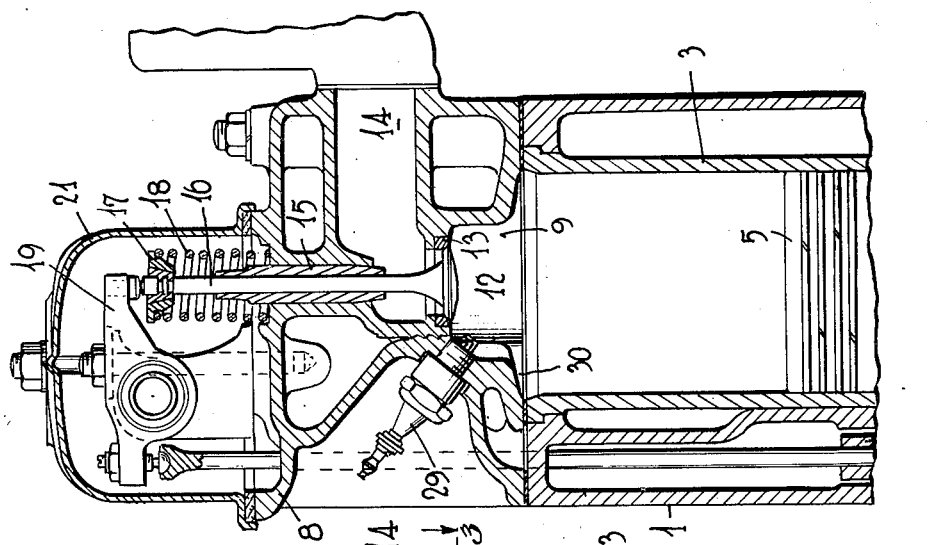
INVENTOR.
David P. Davies,
BY
Emerson B. Llowell Nov. 9, 1943.  D. P. DAVIES  2,334,146
TURBULENCE CYLINDER HEAD
Filed Aug. 25, 1941  2 Sheets-Sheet 2

INVENTOR.
David P. Davies,
BY
Emerson B. Clonnell

Patented Nov. 9, 1943

2,334,146

UNITED STATES PATENT OFFICE 2,334,146

TURBULENCE CYLINDER HEAD

David P. Davies, Racine, Wis., assignor to J. I. Case Company, Racine, Wis., a corporation Application August 25, 1941, Serial No. 408,275

16 Claims. (Cl. 123—191)

The description which follows relates to the details of an improvement in internal combustion engines. More specifically the invention concerns the features of such an engine of the type which has inlet and outlet valves in the cylinder head opposite the end of the reciprocating piston.

As a general principle the power of a valve-in-the-head gas engine depends in large measure upon maximum compression which may be given the gaseous fuel mixture short of detonation or pre-ignition. Several factors limit the effective compression. The principal one is maintaining the fuel charge under compression at a temperature below that which will cause pre-ignition. Another important factor is the space arrangement of the combustion chamber which will prevent detonation, that is, the combustion of the fuel in advance of the orderly wave of ignition emanating from the spark plug.

I have found that the definite form given to the combustion chamber and its arrangement relative to the valves and spark plug are effective in establishing most favorable conditions for ignition of the charge.

One of the objects of my invention is to given the combustion chamber a form in which the hot burned gases will be exhausted or vented through the outlet valve most directly and without unnecessarily sweeping into contact with the walls of the combustion chamber or the spark plug and thus overheating them.

A further object of my invention is to divert the incoming gas mixture past the spark plug and outlet valve so that the latter will be somewhat reduced in temperature.

A still further object of my invention is to give improved turbulence of the fuel charge in the combustion chamber prior to ignition.

Among the objects of my invention is to provide a combustion chamber which will transmit the force of the explosion over the full area of the piston free from detonation of the charge.

It will be apparent that accomplishing the objects of my invention will result in the development of greater power and economy in consumption of fuel, better control of combustion at higher compression ratios with freedom from pre-ignition and detonation.

Generally speaking I obtain these results by placing the side walls of the combustion chamber at an inclination to the center line of the valves, giving the ends of the combustion chamber a circular form and locating them eccentric to the opposite inlet or outlet valve. The semi-circular end of the combustion chamber opposite the inlet valve is inclined to the line of centers of the valve so that the side of the combustion chamber which provides the mounting for the spark plug is moved away slightly from the valves and separated from the inlet valve by a slight space through which the fuel charge is diverted to sweep by the spark plug and thence pass beneath the outlet valve thus cooling both.

As illustrating the preferred form of my invention I have shown a specific embodiment in the accompanying drawings in which Fig. 1 is a vertical longitudinal section of a multiple cylinder internal combustion engine of the valve-in-the-head type;

Fig. 2 is a vertical transverse section of a single cylinder taken on the line 2—2 of Fig. 1;

Figure 3:
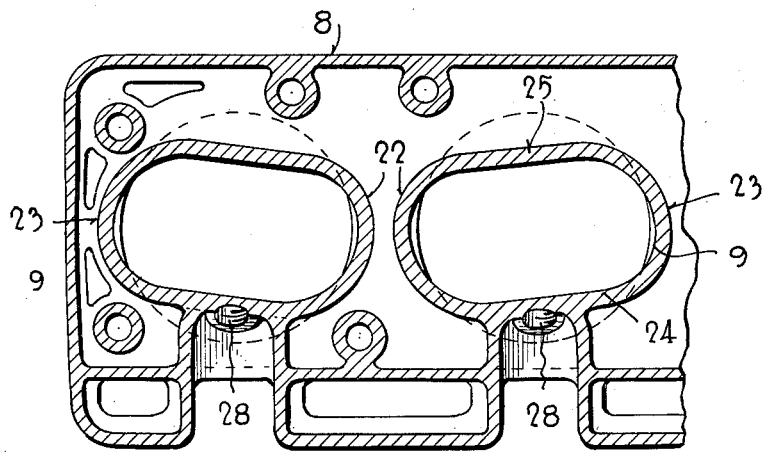
Fig. 3 is a horizontal section of the cylinder head on the line 3—3 of Fig. 1

The general type of internal combustion engine is shown in the drawings to consist of a cylinder block 1 which may have a plurality of cylinders of which two end ones 2 and 3 are illustrated. I have also shown the reciprocating pistons 5 and the customary piston rod 6 on wrist pin 7.

The cylinder head 8 is a casting bolted to the cylinder block 1 in the usual manner. The head has a combustion chamber 9 opposite each cylinder 2, 3. Leading into the combustion chamber 9 is an inlet manifold 10 of the usual type. This inlet is between each successive pair of cylinders and thus serves two inlet valves 11, 11. Each combustion chamber also has an outlet valve 12, 12 operating against the seat 13 of the exhaust manifolds 14, 14.

As is usual the valve seat 13 is required, on account of the high temperatures imparted by the exhaust gases.

I have also shown the customary bushings 15, 15, for the valve stems 16, 16. The upper ends of the valve stems have a fixed collar 17, 17 beneath which are compression springs 18, 18.

The opening movement of the valve is controlled by the rocker arms 19 (Fig. 2) and the valve push rods 20. The valve actuating mechanism is within the housing 21. The construction above described is that typical of the valve-in-the-head combustion engine of two or more cylinders.

The form of the combustion chamber which is deemed particularly advantageous is shown in the drawings to have an elongated form. This form has rounded ends 22, 23 which are semi-circular and have connecting straight sides 24, 25 in the form of vertical walls. This cross-section of the elongated combustion chamber having rounded ends and straight sides, is for the sake of a more accurate term, referred to as substantially elliptical. It will be clearly apparent from Figs. 1 and 3 that the major axis or length of each combustion chamber is substantially the same as the diameter or bore of the cylinders 2, 3.

Figure 4:
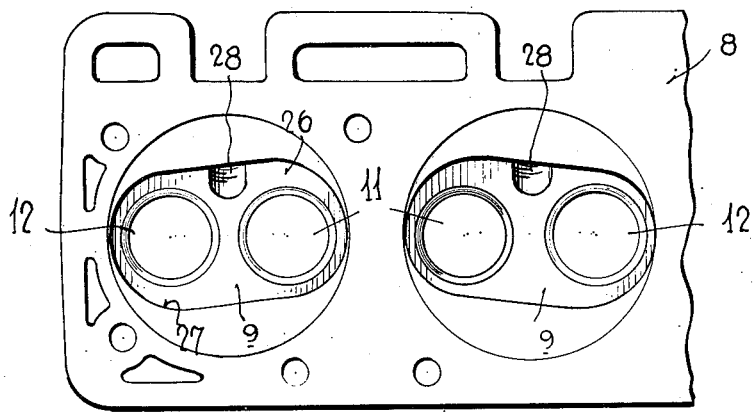
Fig. 4 is a bottom view of the cylinder head.

An important feature of the invention, is however the disposition of this longitudinal axis at a slight inclination to the line of centers of the pairs of valves (Fig. 4). The valves overlie the cylinders and are disposed in the plane of the axes of the cylinders. Thus the valves are in a longitudinal axial plane of the engine block 1.

The slight inclination to this plane of the major axis of each combustion chamber as indicated in Figs. 3 and 4, and the fact that the ends of the chambers have a curvature greater than that of the valve, provides an eccentricity of the chamber around the valve at each end.

Thus the inlet valves 11 are surrounded by the vertical walls of the combustion chamber to provide a pocket 26 on one side only. At the opposite end the side wall of the combustion chamber forms a similar space 27 eccentric of the outlet or exhaust valve 12.

The side wall of the combustion chamber 9 adjacent the pocketed portion 26 and midway between the valves 11 and 12 carries a screw-threaded aperture 28 which forms the mounting of a spark plug 29.

As more clearly shown in Fig. 2 the elongated or generally elliptical cross-section of the combustion chamber 9 is modified at the bottom of the cylinder head 8 by lateral flaring walls 30, 30. These walls have a slight taper providing combustion space above the piston head 15 and beneath the head 8. At this level the combustion chamber may be said to have a perimeter conforming in size and position to the bore of the cylinder.

The design of the cylinder head above described provides improved means for obtaining effective combustion in the engine. With the inlet valve open the fresh relatively cool gaseous charge enters and is diverted against the side wall 26 thus sweeping past the spark plug 29 and thus also cooling the face of the exhaust valve 12 as the charge occupies the cylinder and combustion chamber. By reason of this improved arrangement the charge is compressed under conditions which minimize pre-ignition. The sloping or flaring walls 30, 30 are advantageous during combustion to prevent detonation.

The offset relation of the wall 26 to valve 11 also acts to give the charge a rotating or whirling movement during the suction stroke which is thought to persist during or beyond the compression stroke immediately following.

During the exhaust phase the hot burned gases will rise into the combustion chamber 9 but will enter the exhaust manifold 14 primarily from the remote side 27 opposite the spark plug 29. The latter is thus less likely to become overheated by the exhaust gases.

I have found that the swirling movement of the gases in the combustion chamber adds to the turbulence of the charge and improves the combustion and power.

It is noted that while the somewhat eccentric relation between the combustion chamber 9—9 and the valves 11—11 and 12—12, may be obtained by arranging the several combustion chambers on a common vertical plane and then offsetting the individual valves as desired, and while this is contemplated as within the scope of the invention, certain manufacturing advantages are realized by arranging the parts as shown. Notably, by arranging the combustion chambers at slight angles to the axial plane of the cylinder block, the desired relations may be obtained by placing the valves all in a common vertical plane axially of said block. In the usual construction, this will place them in a plane parallel to the cam shaft and allow many of the valve actuating parts to be duplicates.

While the above description applies to the preferred form of my invention, it is to be understood that the same may be embodied in various forms and changes made in size, proportion and minor details without departing from the invention as defined in the following claims.

What I claim is:

1. In combination, a cylinder block for an internal combustion engine, a head therefor, inlet and outlet valves located in the head and a generally elliptical combustion chamber in said head around said valves, said chamber being located with its major axis extending at an inclination to the plane of said valves.

2. In combination, a cylinder block for an internal combustion engine, a head therefor, inlet and outlet valves located in the head diametrically of the cylinder and a generally elliptical combustion chamber in said head around said valves with its major axis inclined to the diametrical center line of the valves.

3. In combination, a cylinder block for an internal combustion engine, a head therefore, inlet and outlet valves located in the head diametrically of the cylinder and a generally elliptical combustion chamber in said head around said valves with its major axis extending substantially the diameter of the cylinder and inclined to the diametrical center line of the valves.

4. In combination, a cylinder block for an internal combustion engine, a head therefor, inlet and outlet valves located in the head diametrically of the cylinder, a combustion chamber in said head, said combustion chamber having circular ends eccentrically disposed relative to the valves and connecting straight sides, and a spark plug mounting in one side.

5. In combination, a cylinder block for an internal combustion engine, a head therefor, inlet and outlet valves located in the head diametrically of the cylinder, a combustion chamber in said head, said combustion chamber having circular ends centered on opposite sides of the center line of the valves and connecting straight edges, and a spark plug mounting in one side.

6. In combination, a cylinder block for an internal combustion engine, a head therefor, inlet and outlet valves located in the head diametrically of the cylinder, a combustion chamber in said head, said combustion chamber having circular ends centered on opposite sides of the center line of the valves and connecting straight edges, and a spark plug mounting in the side of the chamber spaced farther from the inlet valve than from the outlet valve.

7. In combination, a cylinder block for an internal combustion engine, a head therefor, inlet and outlet valves located in the head diametrically of the cylinder, a generally elliptical combustion chamber in said head around said valves with its major axis extending substantially the diameter of the cylinder at an inclination from the diametrical center line of the valves and its side walls flaring downwardly to the perimeter of the cylinder, a spark plug mounting in one upper side edge of the chamber between the valves, the said side edge of the chamber being farther spaced from the inlet valve than from the outlet valve.

8. In combination, a cylinder block for an internal combustion engine, a head therefor, inlet and outlet valves located in the head diametrically of the cylinder, a combustion chamber in said head, a spark plug mounting in one side thereof, one end of said chamber being eccentric relative to the inlet valve to divert the incoming gaseous charge toward the plug mounting and the other end of the chamber being eccentric relative to the outlet valve and centerd on the opposite side of the center line of the valves to divert the burned gases to the outlet valve from the side of the chamber opposite the plug mounting.

9. In combination, a cylinder block for an internal combustion engine having a plurality of parallel cylinders, a head therefor, a pair of inlet and outlet valves for each cylinder located in the head and arranged in the plane of the axes of the cylinders with consecutive inlet valves in proximity, a combustion chamber in the head connecting each pair of valves with the opposite cylinder, said combustion chambers being substantially elliptical with their major axes inclined oppositely to the said plane of the cylinders, and spark plug mountings on the sides of the chambers which are spaced farther from the inlet valves than from the outlet valves.

10. In combination, a cylinder block for an internal combustion engine having a plurality of parallel cylinders, a head therefor, a pair of inlet and outlet valves for each cylinder located in the head and arranged in the plane of the axes of the cylinders with consecutive inlet valves in proximity, a combustion chamber in the head connecting each pair of valves with the opposite cylinder, said combustion chambers having rounded ends each eccentrically located on opposite sides of the said plane of the cylinders and connecting straight sides, and spark plug mountings on the sides of the chambers which are spaced farther from the inlet valves than from the outlet valves.

11. In combination, a cylinder block for an internal combustion engine, a head therefor, inlet and outlet valves located in the head diametrically of the cylinder, a combustion chamber in the head having a semi-circular portion eccentrically disposed relative to the inlet valve and a spark plug mounting in the side wall of the chamber which is spaced farther from the inlet valve.

12. In combination, a cylinder block for an internal combustion engine, a head therefor, inlet and outlet valves located in the head diametrically of the cylinder, a combustion chamber in the head having a semi-circular portion eccentrically disposed relative to the outlet valve and a spark plug mounting in the side wall of the chamber which is spaced nearer the outlet valve.

13. In combination, a cylinder block for an internal combustion engine, a head therefor, inlet and outlet valves located in the head diametrically of the cylinder, an elongated combustion chamber in the head having rounded ends overlying the edge of the cylinder and straight sides inwardly thereof, the major axis of said chamber being inclined with respect to the center line of the valves, the straight sides of the chamber flaring downwardly to the perimeter of the cylinder and a spark plug mounting on one side of the chamber.

14. In combination, a cylinder block for an internal combustion engine having a plurality of parallel cylinders, a head therefor, a pair of valves comprising an inlet and an outlet valve for each cylinder located in the head with consecutive inlet valves in proximity, a combustion chamber in the head connecting each pair of valves with its respective cylinder, said combustion chambers having rounded ends each eccentrically located relatively to said valves and on opposite sides thereof and connecting straight sides, and spark plug mountings on the sides of the chambers which are spaced farther from the inlet valves than from the outlet valves.

15. In combination, a cylinder block for an internal combustion engine, a head therefor, inlet and outlet valves located in the head and having stem portions extending generally in a plane longitudinally of said cylinder block, and a generally elliptical combustion chamber around said valves having its major axis extending in a plane oblique to the plane of said valve stem portions.

16. In combination, a cylinder block for an internal combustion engine, a head therefor, inlet and outlet valves located in the head, a generally elliptical combustion chamber in said head around said valves with its major axis extending at an inclination from the diametrical center line of the valves and its side walls flaring downwardly to the perimeter of the cylinder, and a spark plug mounting in one side edge of the chamber.

DAVID P. DAVIES.